United States Patent

Starr (10) Patent No.: US 10,304,480 B2
(45) Date of Patent: May 28, 2019

(54) TAPE LIBRARY WITH MULTIPLE GENERATION DRIVES

(71) Applicant: Matthew Thomas Starr, Lafyette, CO (US)

(72) Inventor: Matthew Thomas Starr, Lafyette, CO (US)

(73) Assignee: Spectra Logic Corporation, Boulder, CO (US)

( * ) Notice: Subject to any disclaimer, the term of this patent is extended or adjusted under 35 U.S.C. 154(b) by 0 days.

(21) Appl. No.: 15/718,248

(22) Filed: Sep. 28, 2017

(65) Prior Publication Data

US 2018/0018992 A1 Jan. 18, 2018

Related U.S. Application Data

(60) Provisional application No. 62/343,925, filed on Jun. 1, 2016.

(51) Int. Cl.
| | |
|---|---|
| *G11B 5/008* | (2006.01) |
| *G11B 20/12* | (2006.01) |
| *G11B 15/18* | (2006.01) |
| *G11B 20/18* | (2006.01) |

(52) U.S. Cl.
CPC .......... *G11B 5/00813* (2013.01); *G11B 15/18* (2013.01); *G11B 20/1217* (2013.01); *G11B 20/1833* (2013.01); *G11B 2020/1238* (2013.01); *G11B 2220/41* (2013.01); *G11B 2220/415* (2013.01)

(58) Field of Classification Search
None
See application file for complete search history.

(56) References Cited

U.S. PATENT DOCUMENTS

| | | | |
|---|---|---|---|
| 7,958,326 B2 | 6/2011 | Amano | |
| 8,665,560 B1 | 3/2014 | Biskeborn | |
| 8,797,687 B1 | 8/2014 | Biskeborn | |
| 9,269,375 B2 | 2/2016 | Biskeborn | |
| 2011/0051279 A1* | 3/2011 | Starr | G11B 15/6835 360/71 |

(Continued)

FOREIGN PATENT DOCUMENTS

| | | |
|---|---|---|
| EP | 0919990 A2 | 2/1999 |
| JP | 2008191326 A | 7/2008 |
| JP | 2010027189 A * | 2/2010 |

*Primary Examiner* — Tan X Dinh
(74) *Attorney, Agent, or Firm* — Kenneth Altshuler (57) ABSTRACT

Described is a tape library system that generally comprises a plurality of tape drives and a data bus that links a host computer system to a first tape drive address and a second tape drive address. However, the first tape drive address points to a first controller and switch system that assumes the identity of one of the tape drives. The first controller and switch system is linked to a first tape drive adapted to cooperate with a first type of tape cartridge and a second tape drive adapted to cooperate with second type of tape cartridge. The second tape drive address points to a second controller and switch system that assumes the identity of a different one of the tape drives. The second controller and switch system is linked to a third tape drive adapted to cooperate with the first type of tape cartridge and a third tape drive adapted to cooperate with the second type of tape cartridge.

19 Claims, 6 Drawing Sheets

(56) References Cited

U.S. PATENT DOCUMENTS

| | | | |
|---|---|---|---|
| 2011/0238929 A1* | 9/2011 | Itoh | G06F 3/0607 711/154 |
| 2012/0076622 A1* | 3/2012 | Starr | G11B 15/6835 414/273 |
| 2013/0101373 A1* | 4/2013 | Starr | B65G 1/0407 414/267 |
| 2013/0191588 A1* | 7/2013 | Starr | G06F 3/0611 711/112 |
| 2014/0078609 A1* | 3/2014 | Ballard | G11B 5/00821 360/55 |

* cited by examiner

TAPE LIBRARY WITH MULTIPLE GENERATION DRIVES

CROSS-REFERENCE TO RELATED APPLICATIONS

None.

BACKGROUND OF THE INVENTION

Field of the Invention

The present embodiments are directed to a tape library with multiple generation drives having a single external address that is useful in storing data on a recording medium located in a cartridge and/or retrieving data from such a recording medium.

Description of Related Art

Presently, tape cartridge libraries comprise a plurality of tape cartridges and tape drives. User data intended to be stored to the tape library is transferred from a host system/user of data to a tape cartridge loaded in a compatible tape drive. Most tape libraries are controlled by one of a few Independent Software Vendors (ISV) that control storage operations within a tape library for the user of data. One of the ISV's revenue model is to assesses the number of tape drives in a tape library, or tape library partition, by way of their logical addresses and charges money based on the number of drives that are accessible.

Tape drives, like essentially all other aspects of the tape library, have evolved over time. For example, the open standard Linear Tape-Open (LTO) technology originally developed in the late 1990's, is presently at the eighth generation, LTO-8, with expectations of newer higher-level generations for years to come. Unfortunately, tape cartridges from older LTO generations may not be compatible with newer LTO drives. One solution includes providing different generations of LTO tape drives inside of a tape library wherein each and every LTO tape drive, regardless of its generation, is made visible to the ISV by way of a corresponding logical address. In this way, an ISV can manage all of the tape drives with all of the accessible tape cartridges and appropriately charge for the number of tape drives that it is managing.

It is to innovations related to this subject matter that the claimed invention is generally directed.

SUMMARY OF THE INVENTION

The present embodiments generally relate to a tape library with multiple generation drives making up a suite of drives all having a single external address presented to an ISV or end user.

Some embodiments of the present invention contemplate a tape library system that generally comprises a plurality of tape drives and a data bus that links a host computer system to a first tape drive address and a second tape drive address. However, the first tape drive address points to a first controller and switch system that in certain embodiments assumes the identity of an actual tape drives, which could be a generic tape drive. The first controller and switch system is linked to a first tape drive adapted to cooperate with a first type of tape cartridge and a second tape drive adapted to cooperate with second type of tape cartridge. The second tape drive address points to a second controller and switch system that assumes the identity of a different one of the tape drives. The second controller and switch system is linked to a third tape drive adapted to cooperate with the first type of tape cartridge and a third tape drive adapted to cooperate with the second type of tape cartridge.

Other embodiments of the present invention contemplate a method for storing data to a tape library, the method comprising: providing a tape library system that is communicatively linked with a host computer system, the host computer system linked to a first switch system and controller identifiable to the host computer system via a first tape drive address and to a second switch system and controller identifiable to the host computer system via a second tape drive address; receiving a request from the host computer system to identify available tape drives in the tape library system via the associated addresses; transmitting the first tape drive address and the second tape drive address to the host computer system in response to the request; receiving a mount request from the host computer system to mount a first type of tape cartridge to the first tape drive address; and selecting a first tape drive that is attached to the first tape drive address, the first tape drive is one of a plurality of tape drives attached to the first tape drive address, of the plurality of tape drives the first tape drive is the only one adapted to cooperate with the first type of tape cartridge.

While yet other embodiments of the present invention contemplate a method for storing data to a tape library, the method directed to the tape library comprising: receiving a request from a host computer to identify available tape drives in the tape library; responding to the request a first and a second tape drive address to the host computer; receiving instructions to load a target tape cartridge to the first tape drive address; assessing the target tape cartridge type independent from the host computer; and loading the target tape cartridge to a compatible tape drive of a plurality of tape drives attached to the first tape drive address, the host computer unaware of the plurality of tape drives.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of drive addresses in front of a plurality of drives presented externally. In what follows, similar or identical structures may be identified using identical callouts.

Figure 1:
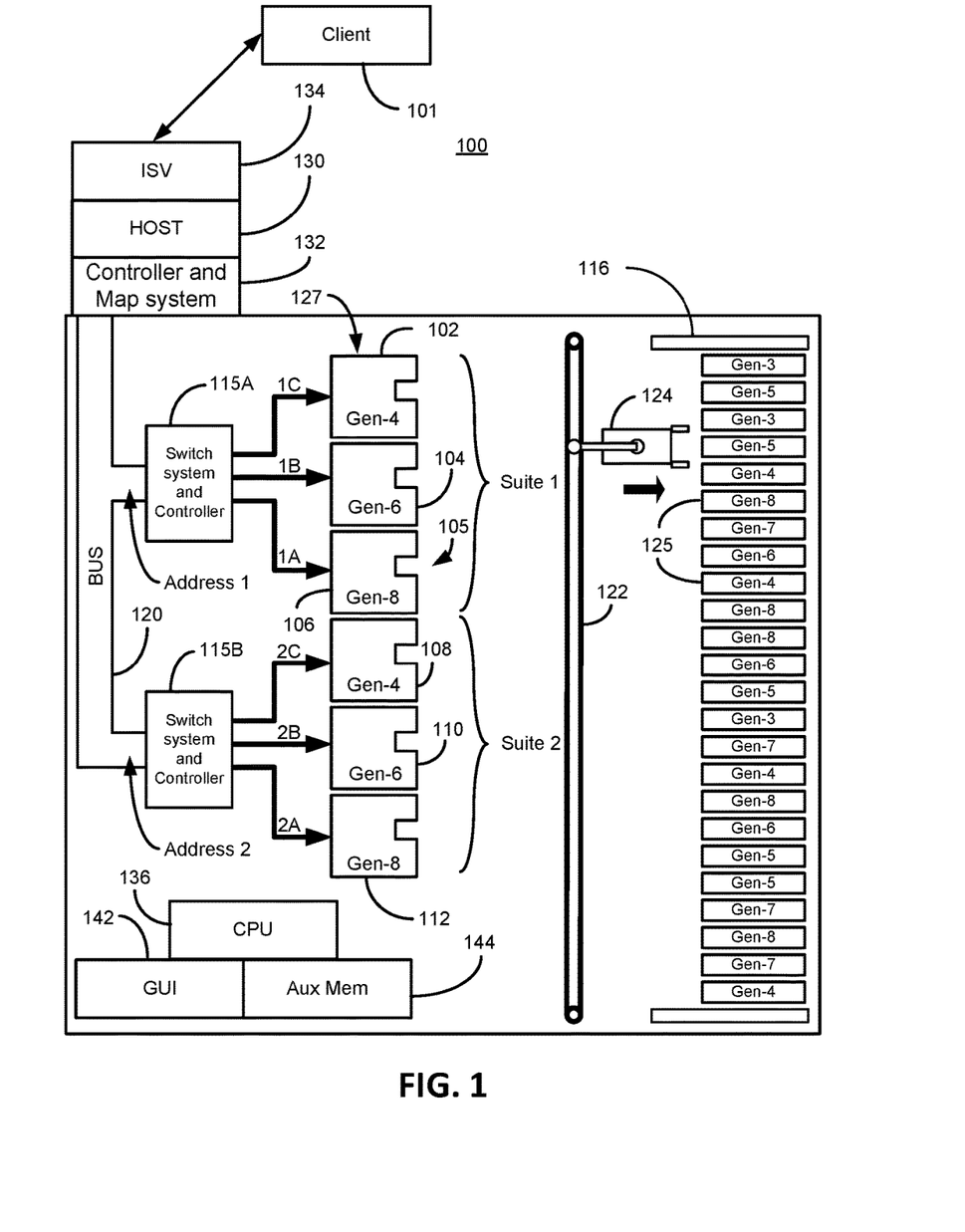
FIG. 1 is an illustration of a data storage arrangement constructed in accordance with certain embodiments of the present invention.

Referring to the drawings in general, and more specifically to FIG. 1, shown therein is a block diagram of a data storage arrangement 100 constructed in accordance with various embodiments of the present invention. As depicted, the data storage arrangement 100 generally comprises a first tape drive suite (Suite 1) and the second tape drive suite (Suite 2) and a plurality of multi-generation tape cartridges 125. In this embodiment, Suite 1 includes a generation-4 tape drive 102, a generation-6 tape drive 104, and a generation-8 tape drive 106. Likewise, Suite 2 includes a generation-4 tape drive 108, a generation-6 tape drive 110, and a generation-8 tape drive 112. Each of the tape drives (generically denoted as element 127) possess an opening 105 adapted to accommodate a tape cartridge 125. Once the tape cartridge 125 is loaded in a tape drive 127 via the tape drive opening (door) 105 (i.e., tape medium is positioned in the tape drive 127 to engage tape read-writer heads (not shown)), storage operations (such as reading and writing data to the tape cartridge 125) can commence.

Rather than being identified by the client 101 or the host 130 as individual/independent tape drives, each tape drive suite is seen by the ISV 134 as a single generic tape drive with a single address able to read and write with any target tape cartridge. For example, Suite 1 includes three tape drives 102, 104 and 106 all identified by the ISV 134 as a single tape drive belonging to Address 1. In this way, the ISV 134, which controls storage operations and charges a client for the total number of tape drives 127 that it manages on behalf of the client only sees one tape drive address (Address 1) in front of the three tape drives 102, 104 and 106, and therefore only charges the client for one tape drive instead of three tape drives. In the present embodiment, Address 1 is associated (in reality) with a first switch system and controller 115 that routes communication to an appropriate tape drive in Suite 1 via pathway 1A, 1B or 1C depending on the appropriate tape drive generation. Communication/storage operations between the ISV targeted tape drive (such as Address 1) and the host computer system 130 is accomplished by way of a bus 120 (which can be a fiber channel/SCSI, Ethernet, etc).

The data storage arrangement 100 further possesses a robotic transporter 122 and picker/grasper device 124 that transfers tape cartridges 125 between a shelf system 115 and the tape drives 102-112. Though depicted by a block diagram pulley system, the robotic transporter 122 can generally be adapted to move the picker device 124 both vertically and horizontally within the library 100. In the present library embodiment, the shelf system 116 provides in-library storage/repository for a plurality of different types of tape cartridges. Though the tape cartridges 125 are broadly selected from a group comprising of different types of tape cartridges (such as a mix of LTO and TS tape cartridges), for ease of explanation certain embodiments described below are directed to LTO standard tape drives and tape cartridges. Accordingly, the tape cartridges 125 are a variety of different LTO generations, more specifically LTO Gen-3 to Gen-8 tape cartridges, and the tape drives are from different LTO generation tape drives LTO Gen-4 through Gen-8 because an LTO-4 tape drive can read/write with an LTO-3 or LTO-4 tape cartridge. In fact, an LTO-6 tape drive can read/write with an LTO-5 or LTO-6 tape cartridge and an LTO-8 tape drive can read/write with an LTO-7 or LTO-8 tape cartridge.

With continued reference to FIG. 1, the library 100 comprises a graphical user interface 142 and an auxiliary memory 144, such as one or more disk drives, solid state memory or other non-volatile memory device/s capable of retaining (storing) relevant information, such as logical addresses, for example. The library 100 further possesses a computer or Central Processing Unit (CPU) 136 that houses at least one macro-controller that actively cooperates with algorithms to orchestrate actions to components within the library 100 over a Computer Area Network (CAN), not shown. The library 100 possesses a controller/map system 132, which can be functionally included with the CPU 136. The controller/map system 132 maintains the addresses of the components mapped out for the client 101 via the ISV 134 (i.e., tape slot addresses, drive addresses, robot addresses, etc.) to direct operations within the library 100. FIG. 1 is illustrative of basic components used to exemplify inventive embodiments disclosed herein. As one skilled in the art will appreciate, a data storage library will generally include devices and structures not shown in the block illustration of FIG. 1, such as additional controllers (e.g., those controlling other components in the library including the robotic).

An ISV 134, which in certain embodiments can be integrated in the client 101 or the host computer 130, identifies (or "sees") the components within the library 100 by transmitting a Small Computer Systems Interface (SCSI) inquiry which scans the storage system's bus (not shown) to discover what devices comprise the storage system 100. Optionally, the map system 132 can provide the information directly to the client 101, or in certain embodiments through the ISV 134. An inquiry can be a client 101 effectively asking the storage system 100 "who are you?" and "what are you?" The storage system 100 can be displayed to the ISV 134 as possessing a plurality of tape cartridges 120 located at specified slot addresses and showing that there are two tape drives at designated addresses (Address 1 and Address 2) as well as a robotic transporter 122 at a designated logical address that is able to receive instructions from the client 101 or the host computer 130 through the ISV 134, for example. This will be covered in more detail down below.

Figure 2A:
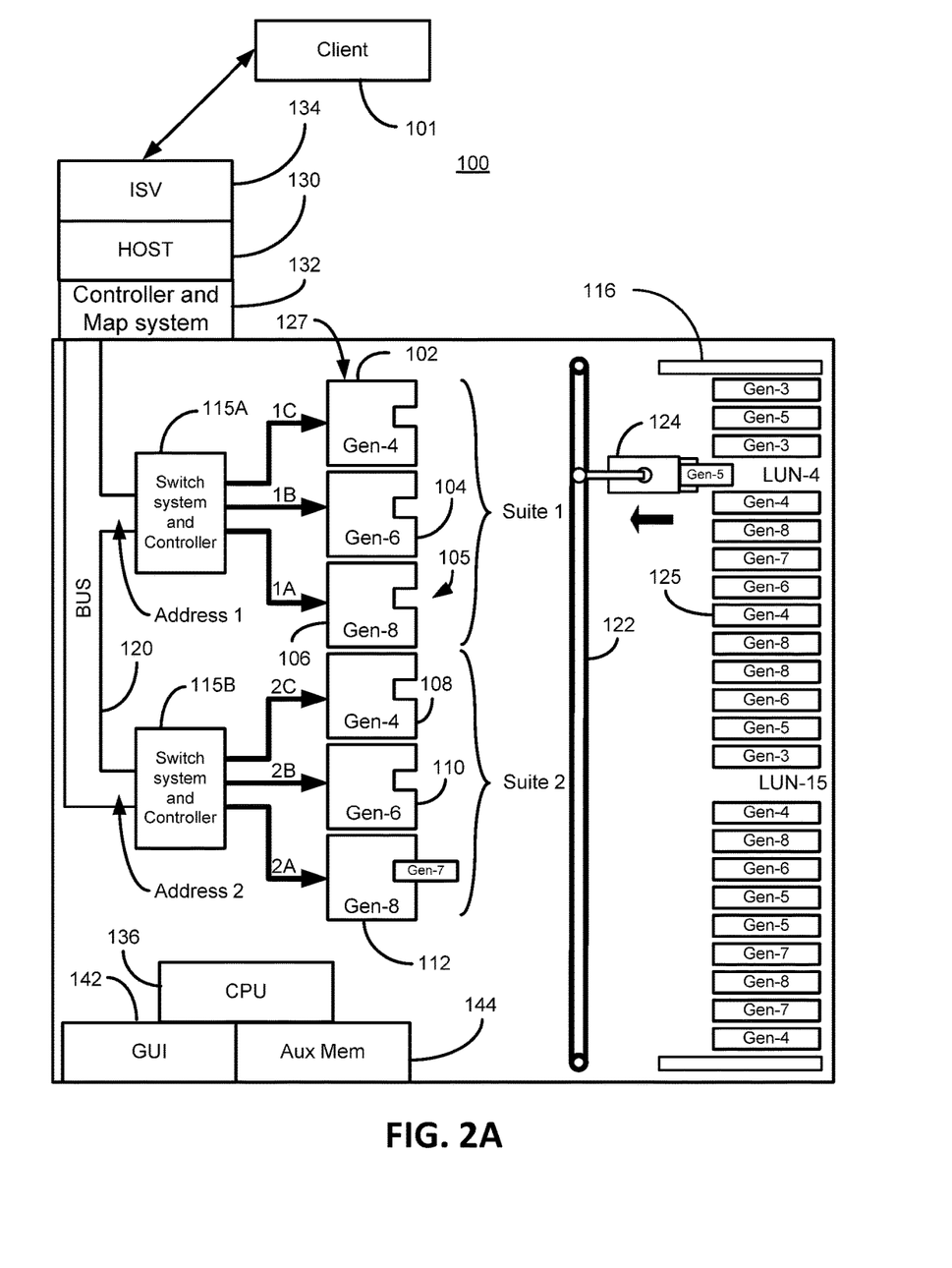
FIG. 2A-2C depict illustrations of the library of FIG. 1 moving various tape cartridges to drives in a drive suite constructed in accordance with certain embodiments of the present invention.
Figure 2B:
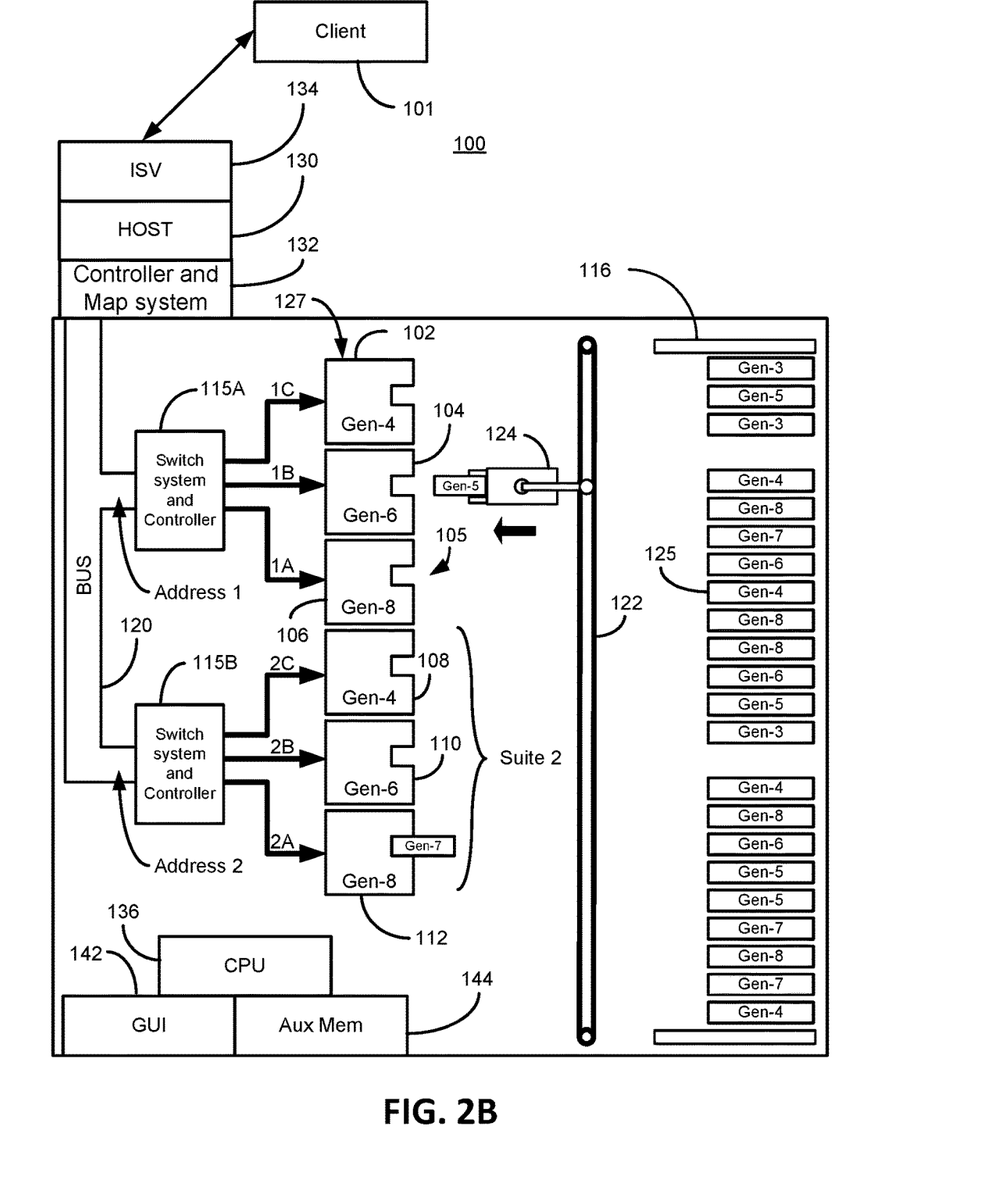
Figure 2C:
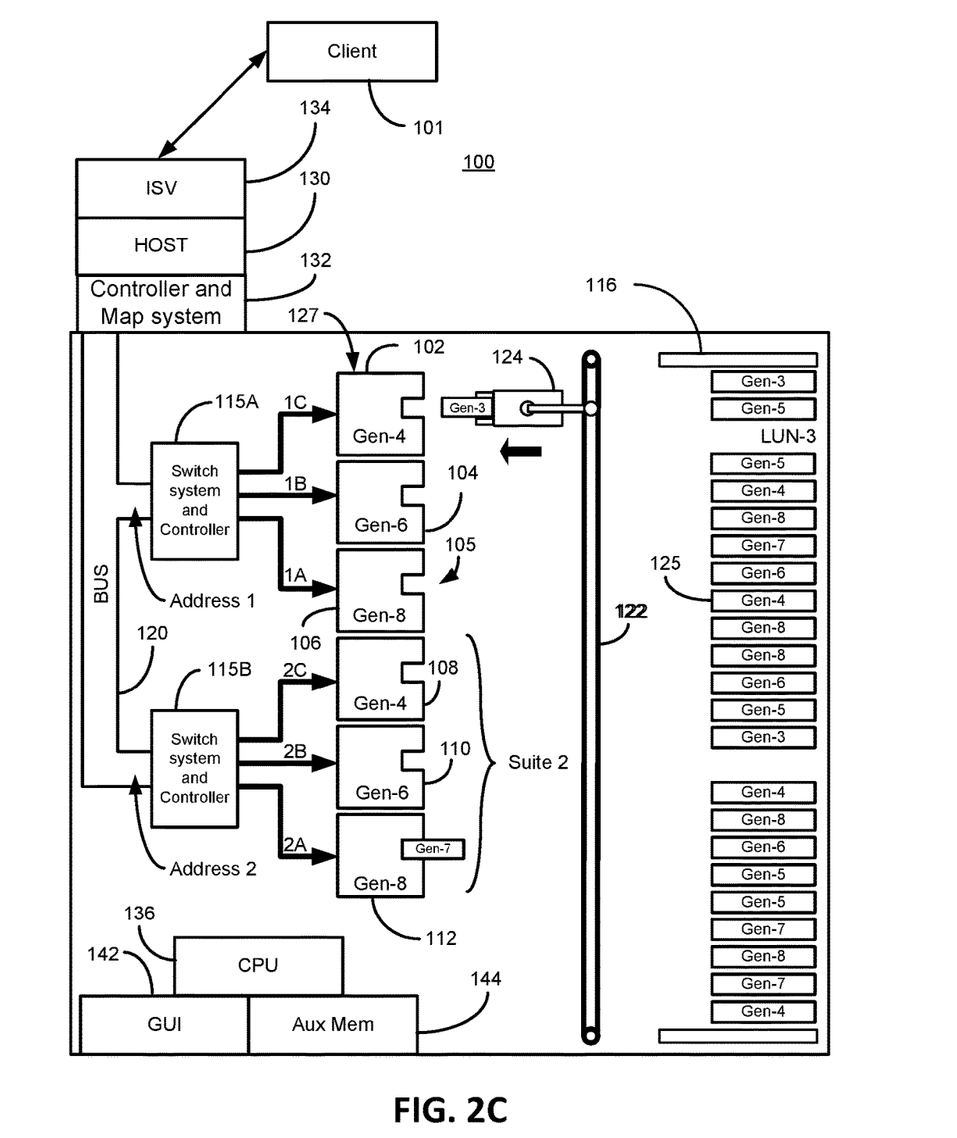
Figure 3:
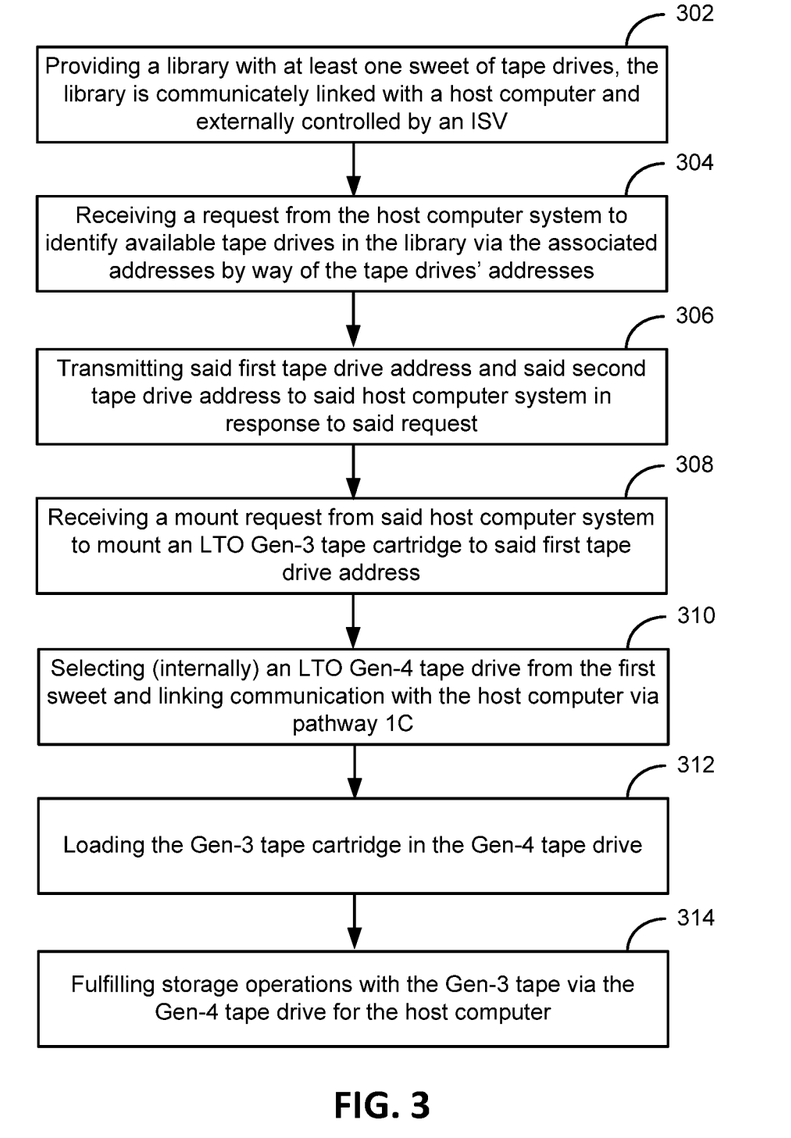
FIG. 3 is a block diagram of a method consistent with certain embodiments of the present invention.

FIGS. 2A-C illustrates an embodiment described in FIG. 3 method steps consistent with embodiments of the present invention. FIGS. 2A-C are described in conjunction with FIG. 3. As shown in FIG. 2A and step 302, a tape library system 100 is provided with a first and second drive suite that each include LTO tape drives from generations 4, 6 and 8 (Gen-4, Gen-6, Gen-8), and LTO tape cartridges 125 from generations LTO-3 through LTO-8 (Gen-3, Gen-4, Gen-5, Gen-6, Gen-7, and Gen-8). The tape library system 100 is communicatively linked with a host computer system 130 by way of an ISV 134. The Independent Software Vendor is a third party that provides a software management program that communicates and directs storage activity with the tape library system 100. In certain embodiments, the ISV is embedded in a server system, but in other embodiments may be elsewhere. Typically, an ISV will issue commands (e.g. SCSI commands) to solicit bio information about the tape library system 100, such as number of accessible tape drives, tape cartridges, robotic transporter/s, etc., as well as send commands to move and load tape cartridges 125 to tape drives 127 around the tape library system 100. The host computer 100 system is linked to a first switch system and controller 115A identifiable to the host computer system 130 via a first tape drive address (Address 1). The host computer 100 system is also linked a second switch system and controller 115B identifiable to the host computer system 130 via a second tape drive address (Address 2).

In step 304, a request from the ISV 134 to determine the tape library system bio by way of the addressable logical unit numbers, or LUNs, of the associated componentry in the tape library system 100 is received by the tape library system 100. In other words, through the request, the ISV 134 via the host computer system 130 identifies the available tape drives 127, tape cartridges 125 and robotic transporter/s 122 in the tape library system 100. In this scenario, the first switch system and controller 115A presents itself to the ISV 134, and in some embodiments to the host computer 130, as tape drive Address 1 and the second switch system and controller 115B presents itself to the ISV 134 as tape drive Address 2. In this way, if the ISV 134 charges a client 101 for the number of available tape drives 127 in the tape library system 100 (which the ISV 134 is responsible for managing), management fees for only two tape drives are charged to the client 101 instead of six tape drives (Gen-4s 102 and 108, Gen-6s 104 and 108, Gen-8s 106 and 112). Accordingly, the tape library system 100 transmits to the ISV 134 and/or the host system 130 that a first tape drive is at Address 1 and a second tape drive is it Address 2, step 306 (even though the first tape drive and second tape drive are virtual).

After the ISV 134, or host system 130, ascertains the tape library system's bio, data storage operations can be controlled by the ISV 134 on behalf of the client 101. In one example, the client 101 may request data retrieval of a file or group of files previously stored to the tape library system 100. Certain embodiments contemplate, the tape library's controller and map system 132 providing which tape cartridge 125, or tape cartridges, possess the requested data to the ISV 134 (and in some embodiments the host computer system 130 if the ISV is running thereon) whereby the ISV 134 and/or the host computer system 130 controls storage operations (data retrieval) with the one or more tape cartridges 125. All elements that are controlled by the ISV 134 (and/or the host computer system 130) are made known to the ISV 134 by way of each component's logical address. For example, if the desired data is on a Gen-5 tape cartridge located at LUN-4 and the target tape drive (as viewed by the ISV 134) is at Address 1, the ISV 134 (and/or the host computer system 130) sends commands to the library system 100 to retrieve the target tape cartridge at LUN-4 and load it to Address 1. This is considered a mount request to mount a target tape cartridge 125 to a target tape drive 127, step 308.

As shown by FIG. 2A, the Gen-5 tape cartridge is grasped by the picker device 124 and withdrawn from a shelf system 116 at LUN-4. FIG. 2B shows the target Gen-5 tape cartridge moved to the Gen-6 tape drive 104, which is the only tape drive in Suite 1 that can cooperate (read and write) with the Gen-5 tape cartridge, step 310. In the present embodiment, it is envisioned that the library's controller system 132 determines that the Gen-6 tape drive 104 is the compatible tape drive for all Gen-5 and Gen-6 tape cartridges in the library 100. In other embodiments, a different controller system within or outside of the tape library system 100 pairs the appropriate tape cartridge with a compatible tape drive. Either way, the ISV 134 (and in some cases the host computer 130) is blind to the suite of different generation tape drives 127 behind Address 1 or Address 2 and therefore will not charge a fee to the client 101 for the number of tape drives that are actually servicing these requests. In brief, the ISV 134 targets Address 1 as the target tape drive, but in reality the switch system and controller 115A directs communication with the ISV 134 to the Gen-6 tape drive 104 behind Address 1 along pathway 1B.

Once loaded, the first switch system and controller 115A routes communication from the ISV 134 and/or host computer 130 by way of the communications bus 120 within the tape library system 100 to the Gen-6 tape drive 104 via the communications pathway 1B. Hence, the data requested by the client 101 is read from the target Gen-5 tape cartridge by the Gen-6 tape drive 104 and transmitted to the client 101 in part via pathway 1B established by the first switch and controller 115A.

FIG. 2C illustratively depicts another tape cartridge move wherein a Gen-3 tape cartridge is being loaded into a Gen-4 tape drive 102 in Suite 1, step 310. Once the Gen-3 tape cartridge is mounted into the Gen-4 tape drive 102 of Suite 1, data can be transferred to and from the Gen-3 tape cartridge by way of data path 1C as managed by the first switch system and controller 115A, step 312 and 314. Also depicted in FIGS. 2A-2C is a Gen-7 tape cartridge loaded/mounted in a Gen-8 tape drive 112 in Suite 2. The second switch system and controller 115B associated with Address 2 receives and transmits data related commands to the ISV 134 and/or host computer 130 as well as user data to the client 101 by way in part along the data path 2A.

As discussed earlier, certain embodiments of the present invention are envisioned to be carried out with LTO tape drives and LTO tape cartridges from different generation. Generally speaking, an LTO tape drive can operatively cooperate, that is perform read/write operations, with a tape cartridge that is either the same LTO generation or one previous LTO generation. For example, an LTO-6 tape drive can store data and retrieve data from an LTO-6 or an LTO-5 tape cartridge. Likewise, an LTO-4 tape drive can store data and retrieve data from an LTO-4 or an LTO-3 tape cartridge, and an LTO-8 tape drive can store data and retrieve data from an LTO-8 or an LTO-7 tape cartridge. Accordingly, one embodiment envisions a suite comprising an LTO-8 tape drive, LTO-6 tape drive, and an LTO-4 tape drive to accommodate LTO-3 through LTO-8 tape cartridges, as depicted in the FIGS.

Figure 4:
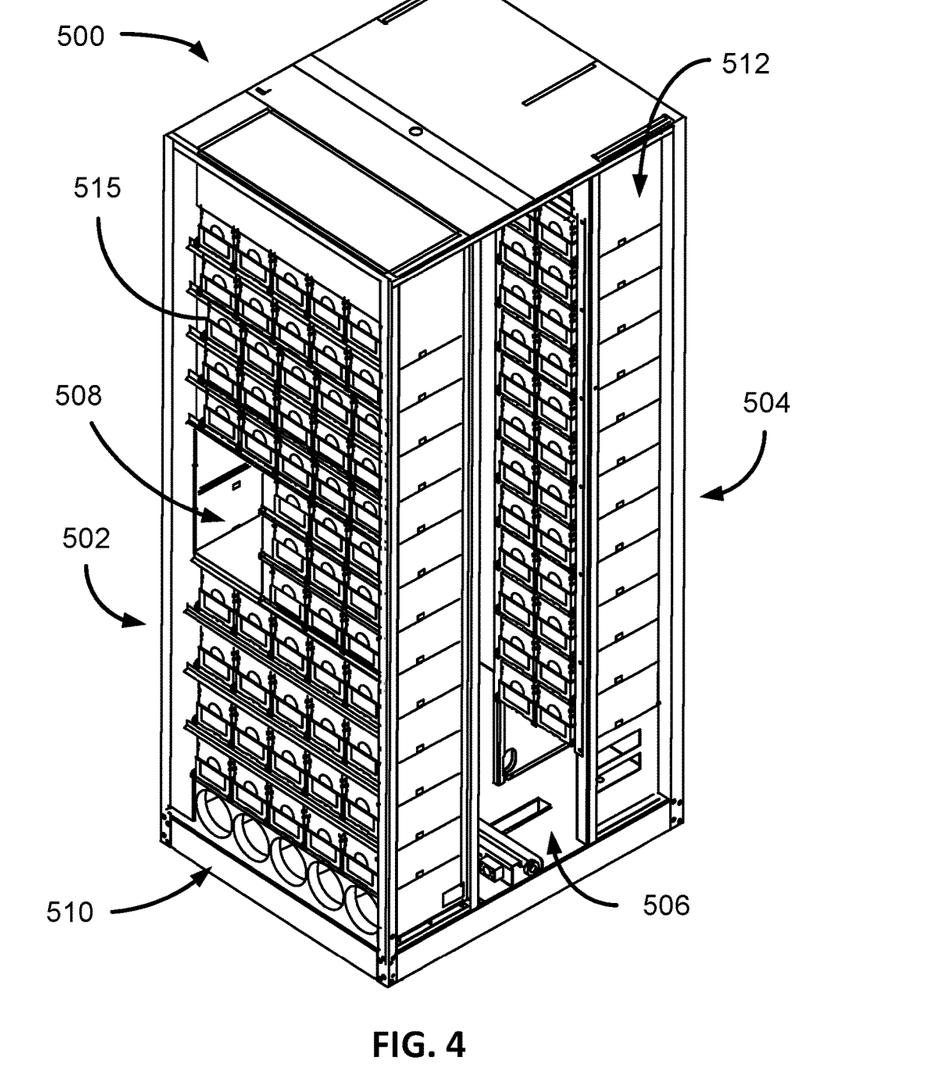
FIG. 4 is an illustration of a T-Finity library cabinet wherein embodiments of the present invention can be commercially practiced.

Embodiments of the present invention can be commercially practiced in a Spectra Logic T-Finity tape cartridge library manufactured by Spectra Logic of Boulder, Colo. FIG. 4 shows a commercial embodiment of one T-Finity unit 500 without an enclosure. The T-Finity unit 500 is a single cabinet whereby multiple cabinets are combinable to make an expandable library. The T-Finity unit 500 comprises a first and second shelf system 502 and 504 that are adapted to support a plurality of the mobile media, such as tape cartridge magazines 515, which is essentially a shoebox shaped container with a plurality of slots comprising a plurality of LTO tape cartridges, archived by the library 500. The second shelf system 504 comprises a plurality of drive suites 512 wherein each Suite has multiple generation LTO tape drives adapted to read and write data to and from a cooperating generation tape cartridge. Each LTO Suite presents to an ISV, not shown, as a single tape drive with a single address. Functionally interposed between the first and second shelf system 502 and 504 is a magazine transport space 506. The magazine transport space 506 is adapted to provide adequate space for a tape cartridge magazine to be moved, via a magazine transport (not shown) and cartridge picker device (not shown), from a position in the first shelf system 502, for example, to/near a drive. Tape cartridge magazines can be transferred into and out from the T-Finity library by an operator via an entry/exit port 508. The T-Finity library comprises a means for cooling as shown by the fans 510, located at the base of the unit 500.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple robots and cabinets can be used to support a plurality of drive suites without departing from the scope and spirit of the present invention. Another example can include using combinations of LTO and other types of mobile cartridges (such as TS tape cartridges used with IBM TS3310 tape drives, or something other) and tape drives while still maintaining substantially the same functionality without departing from the scope and spirit of the present invention. Further, though communication described herein as between a client and the library using an ISV, other types of software programs that control the library and charge by visible addresses can be used without departing from the scope and spirit of the present invention. Further, for purposes of illustration, a first and second tape drive, first and second tape cartridges, first and second drive suites, first and second controller/map systems, etc., are used herein to simplify the description for a plurality of such elements that can include more than a first and second element. Finally, although the preferred embodiments described herein are directed to tape cartridge systems, such as the tape cartridges and tape storage systems, such as a tape library and tape drives, and related technology, it will be appreciated by those skilled in the art that the teachings of the present invention can be applied to other systems, such as disks or other kinds of storage media, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A method for storing data to a tape library, the method directed to the tape library comprising:
   receiving a request from a host computer to identify available tape drives in the tape library;
   responding to the request a first and a second tape drive address to the host computer;
   receiving instructions to load a target tape cartridge to the first tape drive address;
   assessing the target tape cartridge type independent from the host computer;
   and loading the target tape cartridge to a compatible tape drive of a plurality of tape drives attached to the first tape drive address, the host computer unaware of the plurality of tape drives.

2. The method of claim 1 wherein the plurality of tape drives are each adapted to cooperate with a different type of tape cartridge.

3. The method of claim 1 wherein the host computer believes that there is a single tape drive behind the first tape drive address.

4. The method of claim 1 further comprising directing communication between the host computer the compatible tape drive after the assessing step.

5. The method of claim 1 wherein the plurality of tape drives are each different LTO tape drive generations.

6. A method comprising:
   providing a tape library system that includes: a data bus that links a host computer system to a first tape drive address, the first tape drive address points to a first switch system which is linked to a first tape drive adapted to cooperate with a first type of tape cartridge and a second tape drive adapted to cooperate with second type of tape cartridge;
   presenting to the host computer system that the first tape drive address belongs to a first target tape drive;
   receiving an instruction from the host computer system to load a first target tape cartridge which is from the second type of tape cartridge into the first target tape drive;
   in response to the instructing step, loading the first target tape cartridge into the second tape drive, the host computer system is blind to the first tape drive and the second tape drive.

7. The tape library system of claim 6 further comprising performing storage operations between the first target tape cartridge and the second tape drive at the request of the host computer system to perform storage operations between the first target tape cartridge and the first target tape drive.

8. The tape library system of claim 6 further comprising presenting to the host computer system that a second tape drive address belongs to a second target tape drive, the second tape drive address points to a second switch system in the tape library system which is linked to a third tape drive adapted to cooperate with a third type of tape cartridge and a fourth tape drive adapted to cooperate with a fourth type of tape cartridge.

9. The tape library system of claim 8 further comprising receiving a second instruction from the host computer to load a second target tape cartridge which is from the third type of tape cartridge into the second target tape drive and in response to the second instruction, the tape library loading the second target tape cartridge into the third tape drive, the host computer system is blind to the third tape drive and the fourth tape drive.

10. The tape library system of claim 6 wherein the first tape drive is a first generation tape drive adapted to cooperate only with a first generation tape cartridge, and the second tape drive is a second generation tape drive adapted to cooperate only with a second-generation tape cartridge.

11. The tape library system of claim 6 wherein the first type of tape cartridge includes two LTO generations lower than the second type of tape cartridge.

12. A method performed in a tape library, the method comprising:
   communicatively linking the tape library with a host computer system;
   receiving a request from the host computer system to identify available tape drives in the tape library;
   transmitting a first tape drive address associated with a first target tape drive and a second tape drive address associated with a second target tape drive to the host computer system in response to the request, the first tape drive address attached to both a first tape drive and a second tape drive and the second tape drive address attached to a third tape drive, the host computer cannot see the first tape drive, the second tape drive or the third tape drive;
   receiving a mount request from the host computer system to mount a first target tape cartridge to the first target tape drive, the first target tape cartridge is not compatible with the first tape drive or the third tape drive;
   mounting the first target tape cartridge to the second tape drive; and following the mount request,
   responding to the host computer that the mount request is completed.

13. The method of claim 12 wherein the tape library possesses a plurality of tape cartridges that include tape-a cartridges compatible only with the first tape drives, tape-b cartridges compatible with only the second tape drives, and tape-c cartridges compatible with only the third tape drives.

14. The method of claim 13 wherein tape-a cartridges are from a set of two different generation LTO tape cartridges.

15. The method of claim 12 wherein the first tape drive address is linked to a first switch system and the second tape drive address is linked to a second switch system.

16. The method of claim 12 further comprising determining that the second tape drive is compatible with the first target tape cartridge and selecting the second tape drive to cooperate with the first target tape cartridge.

17. The method of claim 16 wherein the determining step and the selecting step are accomplished independent from the host computer.

18. The method of claim 16 wherein the first tape drive address is linked to a first switch system and the second tape drive address is linked to a second switch system and after the selecting step routing communication between said host computer system and said second tape drive via said first switch system.

19. The method of claim 18 further comprising commencing storage operations between said host computer system and said second tape drive via said first switch system.

\* \* \* \* \*